Figure 1:
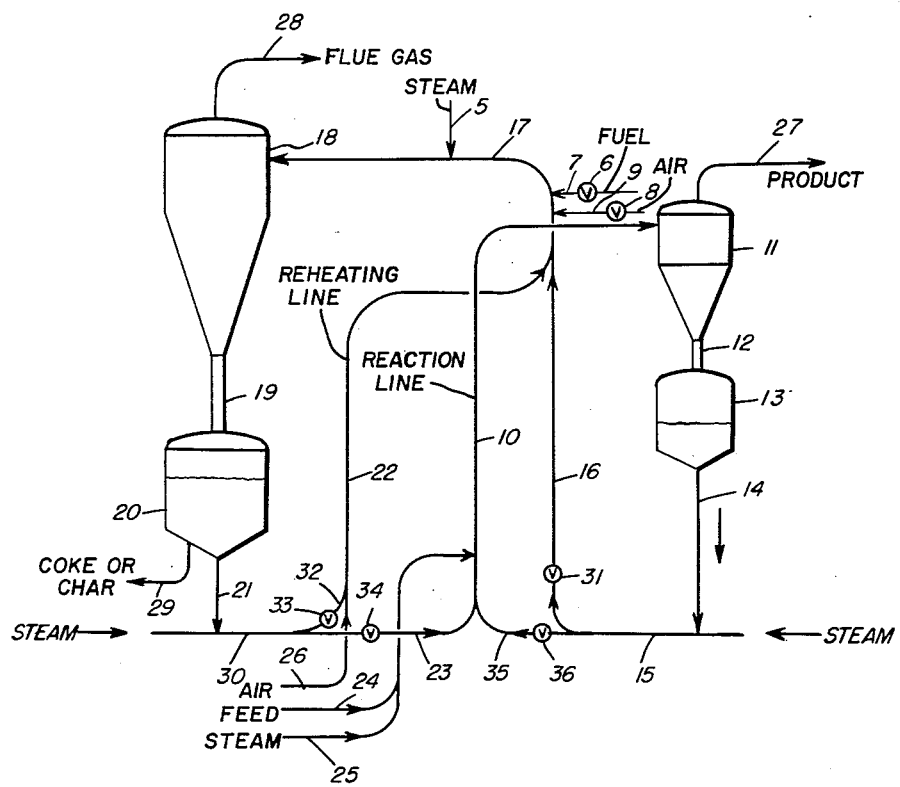

June 19, 1962 J. L. HONNOLD, JR 3,039,955
PYROLYSIS PROCESS
Filed Aug. 21, 1958 2 Sheets-Sheet 1

Inventor
JAMES L. HONNOLD, JR.
By his attorneys
Howson and Howson.

June 19, 1962  J. L. HONNOLD, JR  3,039,955
PYROLYSIS PROCESS
Filed Aug. 21, 1958  2 Sheets-Sheet 2

Inventor
James L. Honnold Jr.
By his attorneys
Howson and Howson

3,039,955
Patented June 19, 1962

3,039,955
PYROLYSIS PROCESS
James Loie Honnold, Jr., Levittown, Pa., assignor to United Engineers & Constructors Inc., Philadelphia, Pa.
Filed Aug. 21, 1958, Ser. No. 756,392
2 Claims. (Cl. 208—132)

This invention relates to a method for the conversion of low value hydrocarbonaceous materials to more valuable products, and in particular to a method for the conversion of hydrocarbonaceous materials in which the heat necessary for conversion is supplied to these materials in a more efficient manner than has been known hitherto.

Various techniques have been applied to the conversion of hydrocarbonaceous materials. According to one recently developed technique a hydrocarbonaceous feed is injected into a conversion zone through which flows a hot moving stream of solids and gases. Conversion takes place in the moving stream, forming vaporous products and non-vaporous residue. The vaporous products of conversion are separated from the solids and residue. The solids together with the residue are then sent to a regeneration or reheating zone where the residue is burned, reheating the solids. The reheated solids are recirculated to the conversion zone.

The system just described has several drawbacks. In the first place, if the residue is refractory in nature, it must be burned either at a relatively high temperature, or for a comparatively long time. If it is burned at a high temperature, and introduced into the conversion zone directly, the tendency is to overcrack the hydrocarbonaceous feed, resulting in a lower yield of desired products. If lower combustion temperatures are used, the residence time required demands a very large combustion zone. This in turn requires large pieces of equipment, which are expensive to build and maintain.

It is therefore an object of the invention to provide a process for the conversion of hydrocarbonaceous material which will be more convenient and efficient than processes hitherto known.

It is another object of the invention to provide a process for the conversion of hydrocarbonaceous material in which high temperature combustion of conversion residue is made practical and convenient.

It is a further object of the invention to provide a process for the conversion of hydrocarbonaceous material at relatively low temperature in which the heat necesary for the conversion may be generated by combustion of the conversion residue at relatively high temperatures.

It is a further object of the invention to provide a system for the conversion of hydrocarbonaceous materials which will require less equipment than in previous systems.

In accordance with the invention these and other objects are attained by means of a process which comprises charging a hydrocarbonaceous feed into a first hot moving stream of gases and entrained solids to form a reaction stream, separating solids from said reaction stream, recycling a first portion of the solids separated from the reaction stream to said reaction stream, charging a second portion of the solids separated from the reaction stream to a reheating stream of gases and entrained hot solids, said reheating stream being at a temperature substantially higher than said first hot moving stream, separating solids from said reheating stream, entraining a first portion of said solids separated from said reheating stream in a stream of gas containing free oxygen to burn a part of said last mentioned solids and to form said reheating stream, and charging a second portion of said last mentioned solids to said reaction stream.

The invention is especially applicable to a two stage pyrolysis process wherein a hydrocarbonaceous material is subjected in a first conversion stage to a hot moving stream of gases and entrained solids, and the products of the first stage conversion are themselves further converted by contact with a stream of very high temperature gas. As applied to such proceses the invention provides a convenient source of the high temperature gas used in the second stage.

The invention therefore further comprises, in a process for the conversion of a hydrocarbonaceous material wherein said material is subjected to a first conversion stage at a first temperature and the products of said first conversion stage are then treated in a second conversion stage at a higher temperature, the improvement which includes introducing hydrocarbonaceous material into a hot moving stream of gases and entrained solids to form a first stage conversion stream, separating solids from said first stage conversion stream to give a vaporous stream of primary conversion products, recycling a first portion of the solids separated from said first stage conversion stream to said first stage conversion stream, charging a second portion of said solids separated from said first stage stream to a reheating stream comprising gases and entrained solids, said reheating stream being at a temperature substantially higher than the temperature in the second conversion stage, separating reheated solids from said reheating stream, entraining a first portion of the reheated solids in a stream of oxygen-containing gas to burn a part of said solids and to form said reheating stream, charging a second portion of said reheated solids to said first stage conversion stream, introducing a third portion of said reheated solids into a third stream of gases to heat said third stream of gases to a temperature above the temperature of the second conversion stage, separating solids from said third stream and introducing the heated gases of said third stream into said vaporous primary conversion products to effect further conversion thereof.

The hydrocarbonaceous materials which may be employed in the present invention include a wide variety of solid and liquid substances. Examples of suitable materials include for instance coal, oil shale, lignite, peat, residual fuel oils such as bunker C fuel oils, coke oven by-product tar, low temperature coal carbonization tar, crude petroleum, reduced crude petroleum, virgin distillate gas oils, catalytic recycle gas oils, kerosenes and naphthas.

The nature of the conversion process which is carried out is also open to wide variation. The conversion may, for example, be a simple pyrolysis in which the hydrocarbonaceous material is converted solely by heat, without catalytic action, or it may be a catalytic process in which the hydrocarbonaceous feed is cracked or reformed in the presence of a catalytic material. In any case, however, there should be a vaporous conversion product and a non-vaporous conversion residue which is at least partly combustible.

The nature of the solids which are entrained in the gas stream into which the hydrocarbonaceous feed is introduced will depend to a great extent upon the type conversion which it is desired to effect. If a simple non-catalytic pyrolysis is being carried out, the solids may be coke or char produced during the process. Alternatively they may be a carbonaceous material derived from some other source, or a catalytically inert non-carbonaceous material such for example as sand or alundum. If the conversion is to be effected catalytically the solids will of course be whatever catalyst is suitable for the particular process. The precise nature of the catalyst is obviously not a part of the invention.

The size of the solid particles depends to a certain extent on the volume and velocity of the entraining stream. In general the solids will range between about 0.001 and about 0.10 inch in diameter, preferably between about 0.002 and about 0.02 inch.

The temperatures which are used in the conversion and reheating streams are also subject to considerable variation and will depend on the reaction being carried out as well as on the nature of the feed and the type of solid materials being used. In general it may be said that the temperature of the reaction stream will depend on the type of reaction and the nature of the products which it is desired to obtain, while the temperature in the reheating stream will be as high as possible and will be limited by the resistance of the recycled solids to high temperatures, or in some instances by the type of structural materials which it is economic to use in making the reheating apparatus. Generally speaking where a single stage conversion is to be carried out the temperature in the conversion zone will range from around 900° F. in the case where catalytic conversion of heat sensitive hydrocarbons is being carried out, to a temperature on the order of 2300° F. where processes such as the production of acetylene are to be carried out. Where a two stage conversion is carried out, the temperature in the first stage is normally between about 900 and about 1900° F. and in the second stage between about 1300° F. and about 2300° F.

The temperature in the reheating zone will of course always be substantially above the highest conversion temperature. Usually it will range between about 1500° F. and 2800° F. It may be pointed out that where the invention is employed in a two stage process and the solids from the reheating zone are used to generate a hot gas which is in turn employed in the second stage conversion zone, the temperature in the reheating zone must be substantially higher than the temperature in the second stage conversion zone.

The reaction time which is employed in the invention is not critical but the invention is particularly advantageous with processes in which shock reaction times, i.e. on the order of less than 1 second are employed. In general it may be stated that in a single stage conversion process the reaction time in the conversion zone will range between about 0.05 and about 10 seconds. In a two stage conversion process, the time in the first conversion zone will usually range from about 0.05 to about 10 seconds and in the second stage from about 0.05 to about 2 seconds.

The pressure employed in the invention will again vary with the particular process being carried out and is not a critical feature of the invention. Normally the pressure in the conversion zone will range between about 1 and about 50 p.s.i., although the invention will obviously be operable and useful with pressures higher or lower than this range.

The invention will be further described with reference to the accompanying drawing which is given for purposes of illustration only and which is not to be taken as in any way restricting the invention beyond the scope of the appended claims.

Figure 2:
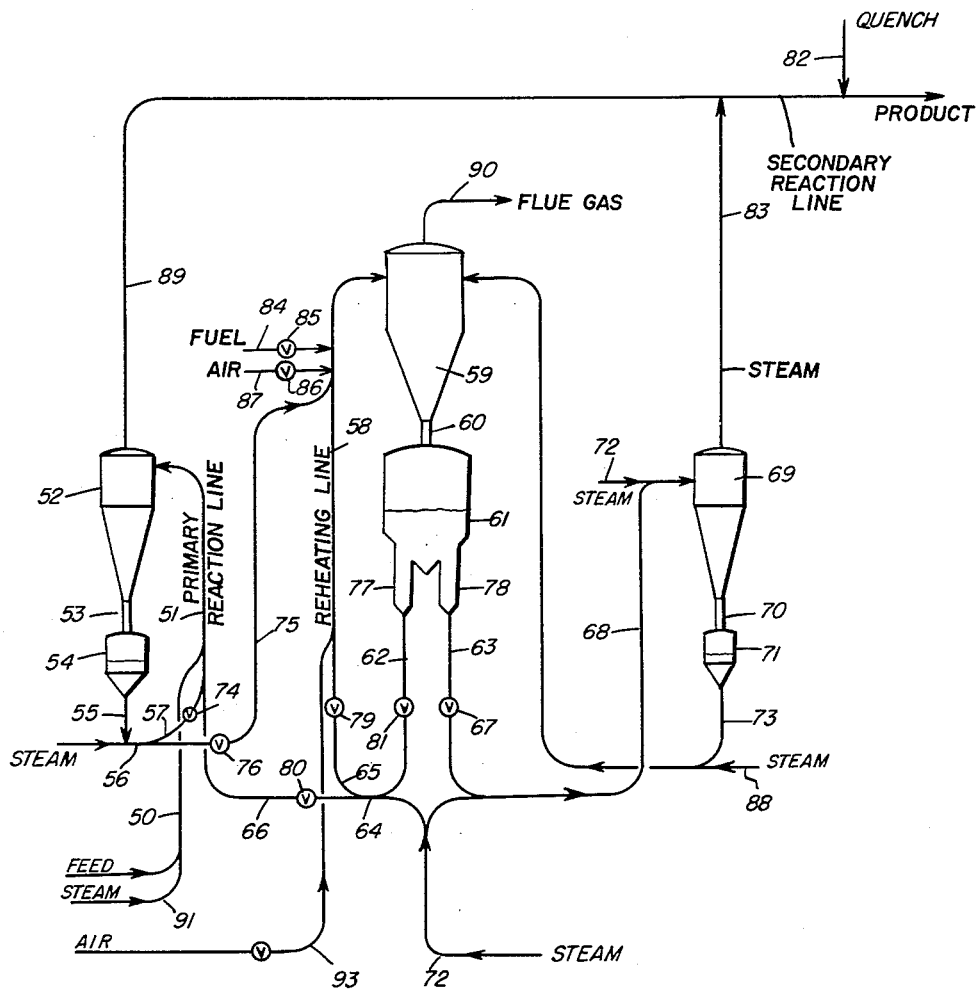

In the drawing:

FIG. 1 is a schematic flow diagram of a single stage conversion process according to the invention, and FIG. 2 is a schematic flow diagram of a two stage conversion process using the invention.

Referring first to FIG. 1, a system employing the invention comprises a reaction line 10 which empties into a separation device 11. The device 11 is indicated in the drawing as a conventional cyclone separator. Obviously, however, other separation devices may be used instead. A duct 12 leading into a surge hopper 13 is provided at the bottom of the separation device 11. A line 14 leads from the bottom of the surge hopper 13 and discharges into a line 15. The line 15 has a branch 35, with a valve 36, which discharges into the reaction line 10, and a second branch 16 with a valve 31 which discharges into line 17. The line 17 is in turn connected to a second separation device 18, which may be a cyclone separator or other similar apparatus.

A line 5 empties into the line 17 just upstream from the separation device 18, by means of which a tempering medium such as steam, may be injected if desired.

The separation device 18 has a duct 19 at its bottom which empties into a second surge hopper 20. A line 21 leads from the bottom of the surge hopper 20 and discharges into a line 30. A branch 32 of line 30 discharges into a reheating line 22, which in turn discharges into the line 17. A second branch 23 of the line 30 connects with the reaction line 10. Branch 32 has a valve 33 and branch 23 has a valve 34. A feed line 24 also discharges in to the reaction line 10 at a point downstream from the junction of the branch 23 with the line 10. A line 25 is provided for introducing a carrying gas into the feed line 24. A line 26 is provided for introducing oxygen or a gas containing free oxygen into the reheating line 22.

An auxiliary air line 9 having a valve 8 and an auxiliary fuel line 7 having a valve 6 are provided for furnishing additional fuel and oxygen to the line 17.

In operation, a hydrocarbonaceous feed is introduced through the line 24. If necessary a carrying gas such as steam will be introduced through line 25 to move the feed through line 24 into the reaction line 10. As the feed enters the line 10 it meets a hot stream of gases and entrained solids flowing through that line. As noted above, the temperature of the mixture into which the feed is introduced will vary depending upon the type of reaction it is desired to carry out, but it is generally between about 1000° and about 2400° F. The solids which are present in the line 10 as the feed is introduced are drawn in part from the surge hopper 13 and in part from the surge hopper 20. The effect of this will be pointed out more clearly below.

When the feed meets the hot solids, cracking or other conversion takes place. The combined feed, hot solids and gases move upwardly through line 10 as a disperse phase, at a velocity of say 1–50 ft./sec. By a "disperse phase" it is meant that the density of the solids-gas mixture in the line 10 is less than about 10% of the loose packed bulk density of the solids. The mixture of solids, gas, vaporous conversion product and unvaporized conversion residue from the line 10 is delivered into the separation device 11. The solids with the unvaporized residue which deposits thereon are separated from the gases and fall down through the duct 12 into the surge hopper 13. The vaporous products of conversion together with carrying gases and the like move out of the system through line 27 to further apparatus in which they may be treated for further recovery. Such further treatment is not a part of the invention and is not shown.

The solids which collect in the hopper 13 may be kept in an aerated condition by means of an innocuous aerating gas introduced into the hopper. For simplicity, this has not been shown in the figure. A stream of these solids, which is essentially at conversion temperature or slightly below, i.e. 900–2300° F. is withdrawn from the hopper through line 14. A carrying gas, such as steam, is introduced into the line 15 and picks up the solids emptying out of the line 14. A portion of these solids is sent back to the reaction line 10 through branch 35 and valve 36. A second portion is sent through branch 16 and valve 31 and is delivered to the line 17. In line 17 these solids meet additional solids at a temperature substantially higher than the temperature of the conversion zone, say at 1600–2900° F. The temperature of the solids which entered the line 17 through the branch 16 is thereby raised and the mixture of solids and gases in the line 17 at say 1500–2800° F. is delivered to separation device 18.

If desired, a cool inert gas, such as steam may be introduced into line 17 through line 5 to temper the material flowing through line 17, should the temperature in that line get too high. This may become especially desirable in catalytic processes where it is essential to burn off all the residue deposited on the catalyst in order effectively to regenerate it. Instead of injecting steam into the line 17, water may be injected or an indirect heat exchanger may be inserted at this point. Alternatively a heat exchanger may be inserted in the line 21 or preferably in the branch 23 leading back to the reaction line 10. These embodiments are not shown.

In another alternative technique, useful where the solids are catalytic, air in excess of that required to completely regenerate the catalyst may be added through lines 26 or 9. The excess air will serve to reduce the temperature in line 17 and carry excessive heat out of the system through line 28.

Flue gases are removed from the separation device 18 through the line 28. The solids remaining fall downwardly through the duct 19 into the hopper 20. Again the solids collecting in the hopper 20 may be aerated with an innocuous gas such as steam, if desired. The solids which collect in the hopper 20, at say 1500–2800° F. are drawn off through the line 21 and are entrained in a carrying gas such as steam in line 30. A portion of the solids so entrained is delivered to the reheating line 22, through branch 32 and valve 33. Oxygen or a gas containing free oxygen is delivered to the line 22 through line 26. A portion of the solids is thereby burned, as the solids move upwardly in line 22 as a dispersed phase and at a velocity of say 1–50 ft./sec. By this means the remainder is raised to say 1600–2900° F. The high temperature solids are then mixed in line 17 with solids drawn from the hopper 13, as described above.

A second portion of the solids drawn from the hopper 20 is delivered via branch 23 and valve 34 and mixed with a second portion of the solids drawn from the hopper 13 and delivered via line 15, branch 35 and valve 36. It is this latter mixture at say 950 to 2050° F. which is delivered to the reaction zone 10.

The proportion of fresh hot solids sent to the reaction line 10 via branch 23 is adjusted with respect to the proportion of solids recycled from the reaction zone by means of valves 34 and 36 so that the temperature of the mixture will be whatever is desired in the reaction line. Naturally the proportion will depend on the temperature of the hot solids and the temperature required in the reaction line.

In certain cases, particularly where the reaction in line 10 is a simple pyrolysis, a solid residue may be produced in greater quantity than is required to furnish the heat for the reactions. In such case excess solids may be withdrawn from the hopper 20 through line 29, as product.

The amount of burning which takes place in the reheating line 22 will of course depend on the type of process being carried out. If desired enough oxygen may be furnished through the line 26 so that at least a portion of the solids delivered through branch 16 is burned in the line 17. Alternatively oxygen for burning these solids may be added through line 9.

Where the process being carried out is the low temperature carbonization of coal it will be particularly advantageous to introduce all or part of the oxygen through line 9. In this case volatile matted produced from fresh char introduced into the line 17 from line 16 will be burned by the oxygen brought in through line 9. The heat contributed thereby will go toward meeting the total heat requirement of the process and thereby reduce the quantity of valuable char which has to be burned.

As indicated above where the solids are catalytic, all residue should be burned off to affect regeneration.

If insufficient residue is produced to supply the heat-requirements of the system additional fuel, e.g. oil or gas, may be introduced into the line 17 through line 7.

It will be understood that various changes and modifications may be made in the system described without departing from the invention. For example, in certain instances it may be desirable to remove solid pyrolysis product, e.g. coke or char, from hopper 13, rather than hopper 20.

As noted above my invention may be used with particular advantage in a two stage pyrolysis process of the type described in the co-pending application of A. S. Parker, Serial No. 688,180, filed October 4, 1957, and a system in which the invention is used in a two stage pyrolysis process is shown schematically in FIG. 2.

Referring to FIG. 2, a feed line 50 is arranged to discharge into a reaction line 51. The reaction line in turn discharges into a first separation device 52. A duct 53 is provided at the bottom of the separation device 52 through which solids are dropped into a surge hopper 54. A line 55 is provided at the bottom of the surge hopper 54 discharging into a line 56. The line 56 has a branch 57 with a valve 74 which empties into the line 51 at a point upstream of the junction of the feed line 50 with the line 51.

The line 56 also has a second branch 75, with a valve 76, which discharges into a reheating line 58. The line 58 in turn discharges into a second separation device 59.

The second separation device 59 has a duct 60 at its bottom which discharges into a surge hopper 61. The hopper 61 has two legs 77 and 78 at its bottom. A line 62, having a valve 81 extends from the leg 77 to a line 64. The line 64 in turn has two branches. A branch 65 having a valve 79 discharges into the reheating line 58. A second branch 66 having a valve 80 discharges into the reaction line 51.

The second leg 78 of the hopper 61 discharges into a line 63, having a valve 67. The line 63 empties into a line 68 which in turn discharges into a third separation device 69. Separation device 69 has a duct 70 at its bottom which empties into a hopper 71. A line 72 joins the line 68 prior to the discharge of line 68 into the separation device 69. A line 73 leads from the hopper 71 to the second separation device 59. A line 88 joins the line 73 prior to the discharge of line 73 into the separation device 59.

A line 89 is provided for carrying vaporous products of conversion overhead from the separation device 52. A line 83 is provided for carrying hot gases from the separation device 69 into the line 89, where they can operate to crack the primary products of conversion in that line. A quenching fluid may be introduced to line 89 by a line 82. A line 90 is provided for removing flue gases from the second separation device 59.

A line 91 is provided for furnishing a carrying gas to feed line 50. A line 92 furnishes carrying gas to the lines 64 and 68. A line 93 furnishes oxygen or a gas containing free oxygen to the reheating line 58.

An auxiliary air line 87 having a valve 86 and an auxiliary fuel line 84 having a valve 85 are provided discharging into line 58 downstream of the junction of branch 75 with line 58.

In operation, a hydrocarbonaceous feed is introduced, with or without the addition of a carrying gas, through line 50 into reaction line 51. In the reaction line 51 it meets a hot stream of solids and entrained gases at 1000–2000° F. so that it is raised to a temperature where at least some pyrolysis occurs, say 900–1900° F. The solids which are present in line 51 are preferably basically catalytically inert and non-carbonaceous, such as sand or alumina. The reason for this preference will be described more fully below. Of course some of the solids in line 51 may have a carbonaceous residue from a previous conversion cycle deposited thereon or mixed therewith. The mixture of solids, carrying gas, vaporous products of pyrolysis and pyrolysis residue moves up through line 51 as a disperse phase at a velocity of say 1–50 ft./sec. The materials enter the separator 52 where the non-vaporous components drop out through duct 53 into hopper 54. The vapors move overhead through line 89.

The solids present in hopper 54 are drawn off through line 55 and are entrained in a carrying gas such as steam introduced into line 56. A portion of these solids is recirculated to the reaction line 51 via branch 57 and valve 74. Another portion is delivered through line 75 and valve 76 to the reheating line 58. In the reheating line 58 these solids meet a moving stream of gases and entrained solids which are at a temperature, say 1600–2900° F., much higher than the temperature in the reaction line 51. As a result the solids introduced from branch 75 are heated.

Normally the solids recirculated from the reaction zone have a carbonaceous residue deposited thereon or mixed therewith and in this instance free oxygen is present in the line 58 so that the residue is burned. The mixture of solids and gases formed in line 58, at a temperature of say 1500–2900° F., is introduced into the separation device 59. Flue gases are separated from the non-vaporous components and are removed through line 90. The non-vaporous components fall down through duct 60 into the hopper 61. From the hopper 61 a first portion of these solids is withdrawn through leg 77, line 62 and valve 81. One part of this first portion is sent via line 64 and its branch 65 and valve 79 to the reheating line 58 where, as indicated above, the pyrolysis residue is burned with oxygen or a free oxygen containing gas introduced through line 93. Another part is delivered to the reaction line 51 via line 64, its branch 66 and valve 80. This fraction serves to furnish the heat necessary for the pyrolysis and vaporization which occurs in line 51.

In certain cases, it may be desirable to introduce a portion, or all of the oxygen furnished to line 58 through the auxiliary air line 87. If the pyrolysis residue produced in line 51 is not sufficient to provide the heat necessary for the entire process, additional fuel (e.g. fuel gas or fuel oil) may be supplied through line 84.

A second portion of the solids in hopper 61 is removed through leg 78, line 63, and valve 67, and sent to line 68. In the line 68 these high temperature (1600–2900° F.) solids meet a gas such as steam, nitrogen, or flue gas introduced through line 72. By contact with the hot solids, the gas is heated. It enters the separation device with the hot solids and is separated therefrom. The hot gas at 1400–2800° F., free from solids, passes overhead through line 83 and is delivered into line 89 where it completes the conversion of the overhead material from separation device 52. The products of this conversion may be quenched to say 200–800° F. by means of a quenching medium, e.g. oil or water, introduced into the line 89 via line 82. Recovery of the resulting product may be carried out in a conventional manner. This is not shown in the figure.

The solids separated in separation device 69 are dropped through duct 70 into the hopper 71. From here they are discharged into line 73 and thence into the separation device 59. A carrying gas such as steam for moving the solids through line 73 may be furnished through line 88.

Generally it is preferred to use steam as the gas in line 72 and as the carrying gas in lines 92 and 88. If the solids are carbonaceous, however, and their temperature is above about 1800° F., the water gas reaction will occur. This may be undesirable, and for this reason it is generally preferred to use non-carbonaceous solids as indicated above.

The invention will be further described with reference to the following specific examples which again are furnished for purposes of illustration only and are not to be taken as restricting the invention in any way.

Example I

In a system of the type shown in FIG. 1, 50,000 lbs./hr. of a bunker C fuel oil [1] preheated to 400° F. are charged to line 10 through line 24 along with 7500 lbs./hr. of 150 p.s.i.g. steam introduced through line 25. Here the oil meets a stream of steam and entrained coke at a temperature of about 1400° F. Pyrolysis occurs and the combined stream is sent to separator 11. 43,600 lbs./hr. of hydrocarbon product is removed through line 27. It analyses as follows (water free):

| | Weight percent |
|---|---|
| $H_2S$, $H_2$, $CH_4$, $C_2H_6$ and $C_3H_8$ | 20.5 |
| $C_2H_4$ and $C_3H_6$ | 22.0 |
| $C_4$ cut (40% butadiene) | 4.8 |
| Light oil | 8.6 |
| Solvents | 1.5 |
| Naphthalene oil | 1.7 |
| Creosote oils | 25.2 |
| Hard pitch | 15.7 |
| | 100.0 |

1,001,000 lbs./hr. of coke at about 1300° F. are removed from hopper 13 through line 14. 841,000 lbs./hr. are recirculated through branch 35 to line 10. 160,000 lbs./hr. are sent to line 17 through line 16.

302,000 lbs./hr. of coke at 1900° F. are removed from the hopper 20 through line 21. 154,000 lbs./hr. are sent to reaction line 10 via branch 23. 148,000 lbs./hr. are sent to combustion line 22 via branch 32. 60,300 lbs./hr. of air are delivered to line 22 through line 26.

1,190 lbs./hr. of coke are removed from hopper 20 through line 29. The particle size of the coke ranges from about 70 to about 700 microns diameter.

Example II

In a system of the type shown in FIG. 1, 100,000 lbs./hr. of a gas oil [2] preheated to 100° F. are charged to line 10 through line 24 along with 15,000 lbs./hr. of 150 p.s.i.g. steam introduced through line 25. Here the oil meets a stream of steam and entrained silica-alumina catalyst particles at a temperature of about 1050° F. Pyrolysis occurs and the combined stream is sent to separator 11. 95,000 lbs./hr. of hydrocarbon product is removed through line 27. It analyses as follows (water free):

| | Weight percent |
|---|---|
| $C_2$ and lighter gas | 2.1 |
| Propane and propylene | 5.3 |
| Butadiene and butylenes | 9.5 |
| Debutanized gasoline | 51.5 |
| Light gas oil | 16.9 |
| Heavy gas oil | 14.7 |
| | 100.0 |

2,440,000 lbs./hr. of catalyst and residue solids at about 950° F. are removed from hopper 13 through line 14. 2,080,000 lbs./hr. are recirculated through branch 35 to line 10. 360,000 lbs./hr. are sent to line 17 through line 16.

2,225,000 lbs./hr. of catalyst solids at 1600° F. are removed from hopper 20 through line 21. 355,000 lbs./hr. are sent to reaction line 10 via branch 23. 1,870,000 lbs./hr. are sent to combustion line 22 via branch 32. 57,300 lbs./hr. of air are delivered to line 22 through line 26.

[1] API gravity _____ 13.1
Approximate analysis (percent by weight):
  H _____ 11.1
  C _____ 87.9
  S and inerts _____ 1.0
  _____ 100.0
Conradson carbon _____ 12.6%
[2] API gravity _____ 24.0
Wt. percent sulfur _____ 1.0
Viscosity at 210° F.-SSU _____ 51

Example III

In a system of the type shown in FIG. 1, 100,000 lbs./hr. of a Western, low rank bituminous non-coking coal [3] preheated to 300° F. are charged to line 10 through line 24 along with 4,000 lbs./hr. of carrying steam (15 p.s.i.g.) introduced through line 25. Here the coal meets a stream of steam and entrained coke at a temperature of about 1200° F. Carbonization occurs and the combined stream is sent to separator 11. 24,000 lbs./hr. of hydrocarbon product is removed through line 27. It analyses as follows (water free):

| | Weight percent |
|---|---|
| Tar | 37.5 |
| Gas | 50.0 |
| Light oil | 12.5 |
| | 100.0 |

1,447,000 lbs./hr. of char at about 1100° F. are removed from hopper 13 through line 14. 1,112,000 lbs./hr. are recirculated through branch 35 to line 10. 335,000 lbs./hr. are sent to line 17 through line 16.

1,618,000 lbs./hr. of char at 1600° F. are removed from the hopper 20 through line 21. 278,000 lbs./hr. are sent to reaction line 10 via branch 23. 1,340,000 lbs./hr. are sent to combustion line 22 via branch 32. 87,500 lbs./hr. of air are delivered to line 22 through line 26.

49,400 lbs./hr. of char product is removed through line 29. 7,610 lbs./hr. of char is consumed.

Example IV

In the system shown in FIG. 2, 50,000 lbs./hr. of the bunker C fuel oil used in Example I, preheated to 400° F. are charged to line 51, through line 50, along with 5,000 lbs./hr. of 15 p.s.i.g. steam introduced through line 91. In line 51 the oil meets a stream of hot gas (steam) and entrained therein, in a disperse phase, some 1,973,000 lbs./hr. of sand containing about 36,000 lbs./hr. of coke at a temperature of about 1200° F. Pyrolysis occurs, reducing the temperature to about 1100° F. The products are sent to the separator 52.

Some 44,000 lbs./hr. of initial pyrolysis products (steam excluded) are removed in line 89.

1,973,000 lbs./hr. of sand containing 42,000 lbs./hr. of coke deposited thereon, at about 1100° F. are removed from hopper 54 through line 55. 1,722,000 lbs./hr. of the mixture are sent through branch 57 to line 51 and 293,000 lbs./hr. are sent to combustion line 58 via branch 75.

1,005,000 lbs./hr. of sand at about 1800° F. are removed from hopper 61 through leg 77. 718,000 lbs./hr. of this is sent to line 58. 201,000 lbs./hr. of air are furnished to line 58 through line 85 and 8,450 lbs./hr. of auxiliary fuel (oil) are furnished through line 84. The combustion of the oil and of the coke introduced into line 58 through branch 75 raises the temperature of the sand introduced through line 75 to about 1800° F.

About 287,000 lbs./hr. of sand at 1800° F. are sent to the line 51 through branch 66 to furnish the heat for pyrolysis.

About 4,930,000 lbs./hr. of sand at 1800° F. are drawn from hopper 61 through leg 78. This sand meets 126,500 lbs./hr. of 15 p.s.i.g. steam introduced into line 68 through line 72. The steam is thereby heated to about 1700° F.

This steam combined with steam introduced into line 68 through line 92 to make a total of about 131,500 lbs./hr. is sent to line 89 where it meets the products of primary pyrolysis. The primary pyrolysis products are thereby heated to approximately 1400° F. for further pyrolysis. After quenching to 500° F. by means of water the final pyrolysis products (water free) analyse as follows:

| | Mol. percent |
|---|---|
| Butadiene | 9 |
| $C_2H_4$ | 20 |
| $C_3H_6$ | 13 |
| Other olefins | 8 |
| Saturated hydrocarbons (90% $CH_4$) | 40 |
| $H_2$ | 10 |
| | 100 |

A consideration of the foregoing specification shows that the invention furnishes a convenient and economic means for carrying out a host of different conversion processes. Because completely independent cycles are provided for heat generation and for conversion, each of these sub-processes can be carried out under the conditions of temperature which are most efficient. Thus for example, the conversion can be carried out at a relatively low temperature, sufficiently moderate so that neither the initial feed material nor the products of pyrolysis are adversely effected. At the same time the heat may be furnished by the combustion of conversion residue at an extremely elevated temperature. By mixing the high temperature solids from the reheating zone with lower temperature solids before they are introduced into the conversion zone, the high temperature solids are tempered before they contact the feed and thus overcracking of the feed is avoided.

Moreover, because the amount of solids exchanged between the heating and conversion zones may be varied by a valve adjustment or by other equally simple control means, the system is highly flexible and may be readily adjusted to accommodate different types of feed, or to give different products. Furthermore, it is possible to provide an integrated system which permits a two stage pyrolysis process to be carried out with the initial stage being conducted at a relatively low temperature and with provision being made for furnishing high temperature gas to carry out the second stage conversion.

I claim:

1. A process for the conversion of hydrocarbonaceous materials which comprises introducing a hydrocarbonaceous material into a first hot moving disperse phase stream of gases and entrained solids to form a reaction stream, separating solids from said reaction stream, dividing said separated solids into a first distinct fraction and a second distinct fraction, recycling said first fraction directly to said reaction stream, charging said second fraction directly to a reheating stream of gases and entrained hot solids, said reheating stream being at a temperature substantially higher than said first hot moving stream, separating solids from said reheating stream, dividing said last named separated solids to form a first distinct fraction of reheated solids and a second distinct fraction of reheated solids, entraining said first distinct fraction of reheated solids directly in a stream of gas containing free oxygen to burn a part of said last mentioned solids and to form said reheating stream, and charging said second distinct fraction of reheated solids directly to said reaction stream at a point upstream from the point of introduction of said hydrocarbonaceous material.

2. In a process for the conversion of a hydrocarbonaceous material, wherein said material is subjected to a first conversion stage at a first temperature and the products of said first conversion are then treated in a second conversion stage at a higher temperature, the improvement which comprises introducing hydrocarbonaceous material into a hot moving stream of gases and entrained solids to form a first stage conversion stream, separating solids from said first stage conversion stream

---

[3]
| | Weight percent |
|---|---|
| Fixed carbon | 50.5 |
| VCM | 44.2 |
| Ash | 4.8 |
| Moisture | 0.5 |
| | 100.0 | to give a vaporous stream of primary conversion products, recycling a first portion of the solids separated from said first stage conversion stream to said first stage conversion stream, charging a second portion of said solids separated from said first stage conversion stream to a reheating stream comprising gases and entrained solids, said reheating stream being at a temperature substantially higher than the temperature in the second conversion stage, separating reheated solids from said reheating stream, entraining a first portion of the reheated solids in a stream of oxygen-containing gas to burn a part of said solids and to form said reheating stream, charging a second portion of said reheated solids to said reaction stream, introducing a third portion of said reheated solids into a third stream of gases to heat said third stream to above the temperature of the second conversion stage, separating solids from said third stream and introducing the heated gases of said third stream into said vaporous primary conversion products to effect further conversion thereof.

References Cited in the file of this patent

UNITED STATES PATENTS

| | | |
|---|---|---|
| 2,325,516 | Holt et al. | July 27, 1943 |
| 2,685,498 | Dickinson | Aug. 3, 1954 |
| 2,741,549 | Russell | Apr. 10, 1956 |
| 2,796,391 | Brown | June 18, 1957 |

FOREIGN PATENTS

| | | |
|---|---|---|
| 1,117,561 | France | May 24, 1956 |
| 1,142,447 | France | Sept. 18, 1957 |
| 793,123 | Great Britain | Apr. 9, 1958 |